United States Patent Office 3,284,009
Patented Nov. 8, 1966

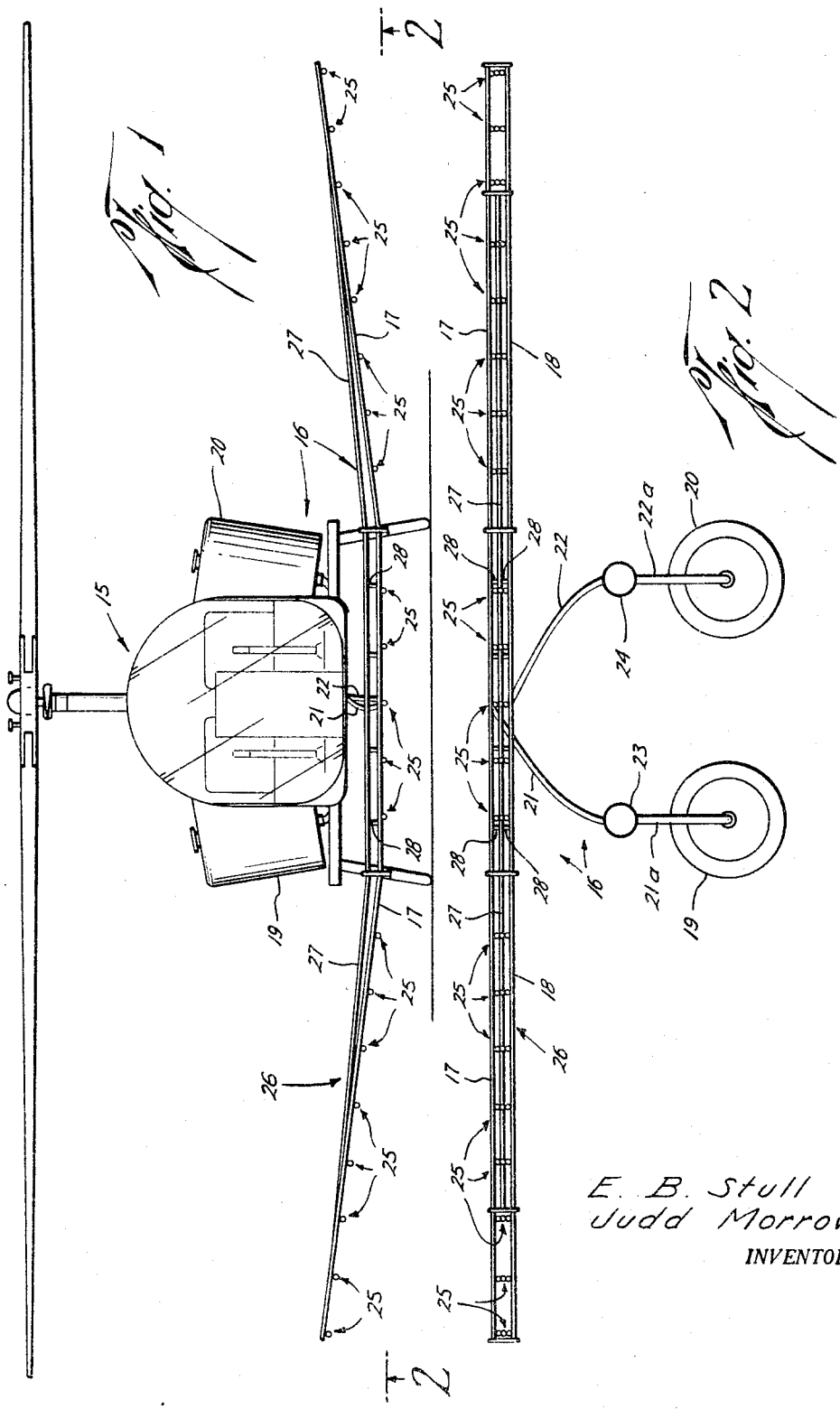

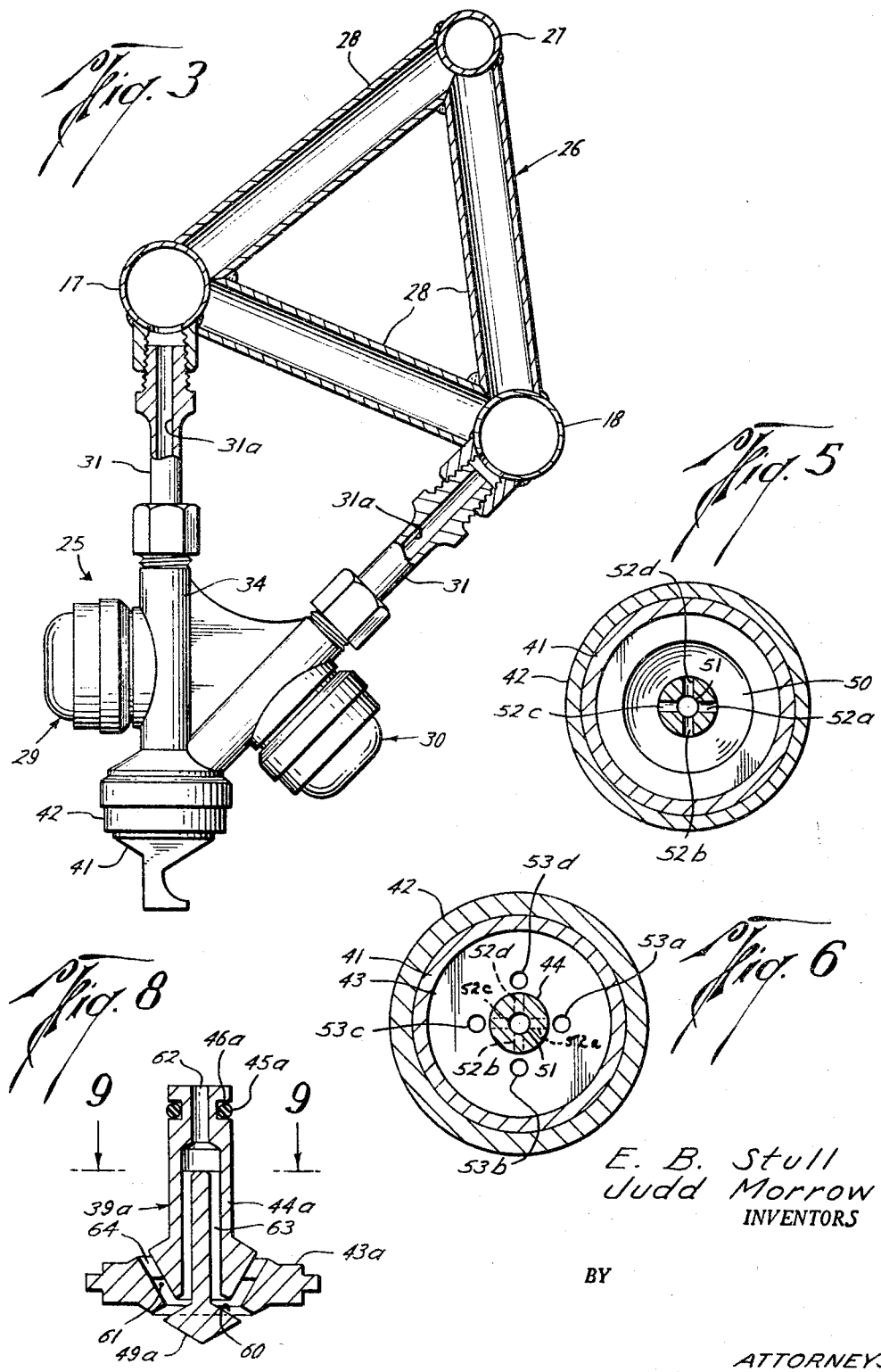

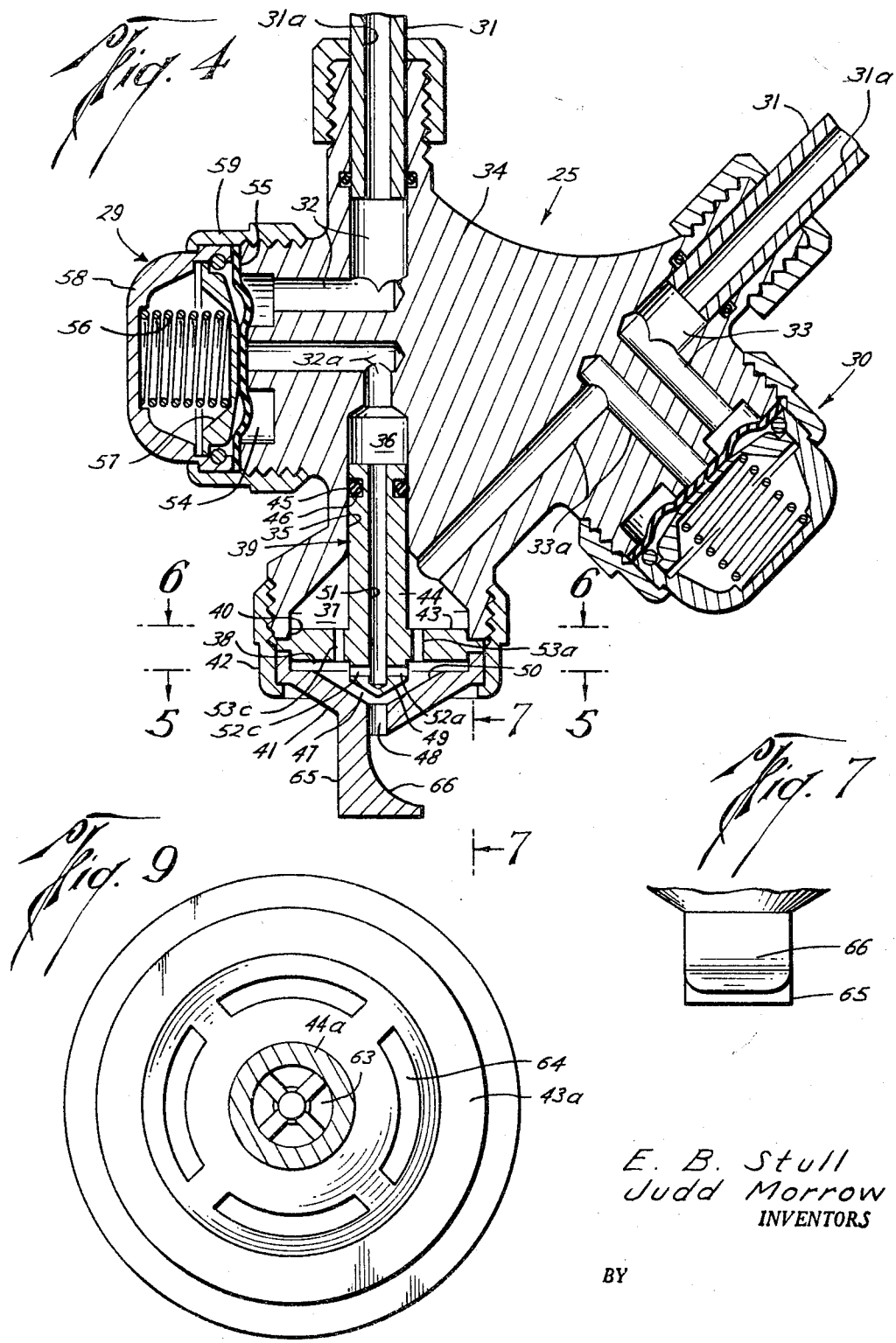

3,284,009
APPARATUS FOR MIXING AND DISPENSING FLUIDS
Emerson Bosse Stull and Judd Morrow, San Antonio, Tex., assignors, by mesne assignments, to Hercules Incorporated, a corporation of Delaware
Original application May 2, 1961, Ser. No. 105,258, now Patent No. 3,197,299, dated July 27, 1965. Divided and this application Apr. 23, 1965, Ser. No. 461,218
3 Claims. (Cl. 239—427)

This invention relates to an apparatus and a process for mixing and dispensing fluids. More particularly, it relates to a spray system for reducing drift during spraying operations and especially for reducing drift while spraying agricultural control chemicals from aircraft.

This application is a division of Serial No. 105,258 filed May 2, 1961 which is a continuation-in-part of our copending application Serial No. 34,440 filed June 7, 1960 and entitled "Apparatus and Process for Mixing and Dispensing Fluids", now abandoned.

In one of its novel aspects, the invention relates to a multi-fluid mixing nozzle for continuously blending dispersing or dissoluting a plurality of fluids to a desired degree in an optimum period of time. Another of its novel aspects relates to aircraft spray apparatus for metering and mixing the components of a spray formulation during actual spraying operations to produce an emulsified spray mixture of substantially uniform and predetermined composition and consistency, and for evenly distributing such a mixture in a specified amount only over a limited target area. In still another of its aspects, the invention relates to an apparatus and a process for the spray application of a mixture in the form of a thick, heavy invert emulsion without requirement of excessive spraying pressures, yet permitting the spray mixture to be formed into a predetermined spray pattern for evenly distributing it in a predetermined amount only over a limited target area. In still another of its novel aspects, the invention relates to new spray mixtures of agricultural control chemicals comprising invert emulsions of these materials which are characterized and distinguished from presently known spray mixtures by their thick, heavy, creamy or mayonnaise-like consistencies, and to means for producing them.

The term "invert emulsion," "inversion," and terms of similar import as used throughout the specification and claims, are intended to include emulsions of the water-in-oil type, as distinguished from the more common standard oil-in-water type of emulsions. That is, these terms include emulsions in which the continuous phase is oil or an oil solution and the discontinuous phase is water or an aqueous solution.

The terms "oil solution," "oil solution concentrate" and terms of similar import as used in the specification and claims refer to mixtures of the various components in the oil phase of an invertable spray formulation and may include, for example, oils, emulsifiers, wetting agents, spreader-stickers, active ingredients such as agricultural control chemicals and the like, the solution being capable of forming an invert emulsion when mixed with water or an aqueous solution, which invert emulsion is characterized by its relatively thick, heavy, creamy or mayonnaise-like consistency.

The term "aqueous solution" and terms of similar import as used in the specification and claims refer to mixtures of the various components in the water phase of an invertable spray formulation and may include, for example, water, active ingredients such as agricultural control chemicals and the like, the solution being capable of forming an invert emulsion when mixed with oil or an oil solution, which invert emulsion is characterized by its relatively thick, heavy, creamy or mayonnaise-like consistency.

The terms "flash invert emulsion," "instant flash invert emulsion" and terms of similar import, as used throughout the specification and claims, are intended to include invert emulsions which are formed essentially instantaneously, for example, in the relatively short period of time during which fluids are retained in a mixing nozzel during a continuous spraying operation.

It is common practice to apply agricultural control chemicals by spraying them from portable ground equipment, from aircraft, from boats or even from fixed ground installations. In carrying out such spraying operations, the primary objective is to evenly distribute a specified amount of the control chemical only over a limited target area and to do so in the most efficient and economical manner.

According to present commercial practice, the various components of the spray formulation generally are premixed to produce the spray mixture in its application form prior to the actual spraying operation, although in some cases, concentrates of the active ingredients may be mixed with water or other diluents to produce the spray mixture during the spraying operation. While the nature and composition of presently known spray mixtures vary widely, they generally are applied in the form of standard oil-in-water type of emulsion. In any event, these spray mixtures, in their application forms, are characterized by their relatively thin, free-flowing or watery-like consistencies.

The present spraying procedures have many undesirable features and disadvantages. For example, and particularly with reference to spraying operations involving premixing of the spray formulation components, there is generally a considerable amount of waste encountered because of the inability of the applicator to premix only the exact amount of spray mixture required for any particular spraying operation. In addition, with many of the presently known spray formulations, it is difficult to agitate the spray mixture in the supply tank during the spraying operation sufficiently to keep it uniformly dispersed so that the material being discharged from the spray nozzle will have a uniform composition.

However, the most serious and critical problem encountered in either type of spraying operation and particularly when spraying agricultural control chemicals such as insecticides, fungicides, herbicides or the like, is the heretofore uncontrollable tendency of particles of the spray mixture to drift from the selected target area to other areas remote therefrom. Such drift not only causes undesirable damage to plants, animals and structures which are outside of the target area, but also reduces the effectiveness of the spraying operation since the specified amount of the active ingredient is not uniformly distributed over the target area. Of course, when, as is often necessary or at least highly desirable because of the extent or inaccessibility of the target area or other reasons, attempt is made to spray these materials from aircraft, this problem of drift becomes even more critical and may even prevent utilization of such advantageous spraying technique.

The critical nature of this drift problem is demonstrated by the fact that in some jurisdictions, laws greatly restrict or even prevent the spray application of some of these control chemicals under any conditions. However, it is nonetheless desirable and it is one of the objects of this invention to provide a spray system for the spray application of agricultural control chemicals, particularly for their spray application from aircraft, in which substantially all of the mixture is confined to and evenly distributed in a predetermined amount only over a limited target area and drift thereof to other areas remote from the target area is substanitally reduced or essentially eliminated from a practical standpoint.

We have discovered new spray mixtures of agricultural control chemicals comprising invert emulsions of these materials which are characterized and distinguished from presently known spray mixtures by their thick, heavy, creamy or mayonnaise-like consistencies. It was considered that spray application of these control chemicals or other active ingredients by spraying them in the form of such thick, heavy invert emulsions would overcome the problem of drift.

However, in attempting to apply these new spray mixtures by conventional spray processes and apparatus, new difficulties were encountered. For example, it was found that when the invert emulsion spray mixture was produced in a separate batch-wise mixing operation prior to the actual spraying operation, according to one form of the present practice, excessive pressure was required to pump it through the spray equipment. Also, it was discovered that even when sufficient pressure was provided to force the premixed invert emulsion spray mixture through the spray equipment, still satisfactory results could not be obtained. For example, the spray mixture was discharged from the spray nozzle intermittently or in spurts, rather than smoothly and continuously. In addition, it could not be atomized in the spray nozzle into a predetermined spray pattern capable of distributing the active ingredients in the desired amount and in a uniform manner over only a limited target area.

An object of this invention is to provide a spray system for reducing drift during spraying operations.

Another object of the invention is to provide new spray mixtures of agricultural control chemicals such as insecticides, fungicides, herbicides or the like.

Another object of the invention is to provide new spray mixtures of active ingredients such as agricultural control chemicals which, in their application forms, comprise invert emulsions characterized by their relatively thick, heavy, creamy or mayonnaise-like consistencies.

Another object of the invention is to provide new invert emulsion spray mixtures of the character described in the foregoing object in which the active ingredients may be supplied in either or both of the oil phase and water phase components of the spray formulation.

Another object of the invention is to provide a new spray formulation comprising an oil phase and a water phase, one or both phases containing an active ingredient such as an agricultural control chemical which, when combined in the proper proportions and mixed together to a sufficient degree, are capable of producing instant flash invert emulsion spray mixtures characterized by their relatively thick heavy, creamy or mayonnaise-like consistencies.

Another object of the invention is to provide a process for the manufacture and spray application of invert emulsion spray mixtures of the character mentioned in the foregoing objects in which the invert emulsions are produced only during and only in an amount sufficient for the actual spraying operations.

Another object of the invention is to provide an invert emulsion of an agricultural control chemical which is extremely stable and not easily broken even when separated into relatively small discrete droplets as may be required in connection with spraying operations.

Another object of the invention is to provide a spray mixture which, as distinguished from presently known relatively thin or watery-like spray mixtures, comprises a relatively thick, heavy invert emulsion which can be separated during a spraying operation into a desired spray pattern comprising a plurality of discrete droplets having a substantially uniform composition and a limited, but predetermined size range.

Another object of the invention is to provide an apparatus and a process for the spray application of a spray mixture in the form of a thick, heavy invert emulsion without requirement of excessive spraying pressures, yet permitting the invert emulsion to be formed into a predetermined spray pattern for distribution in a uniform manner and in a specified amount only over a limited target area.

Another object of the invention is to provide a spray apparatus and a spray process according to the foregoing objects in which the spray mixture comprises an agricultural control chemical.

Another object of the invention is to provide aircraft spray apparatus for continuously metering and mixing the components of a spray mixture during a spraying operation so as to provide an emulsified spray mixture of substantially uniform and predetermined composition and consistency and for distributing such a spray mixture in a uniform manner and in a predetermined amount only over a limited target area.

Still another object of the invention is to provide aircraft spray apparatus for substantially reducing drift and overspray during the spray application of agricultural control chemicals.

Still another object of the invention is to provide a multi-fluid mixing nozzle for continuously blending, dispersing or dissoluting a plurality of fluids to a desired degree in an optimum period of time and particularly for continuously dispersing the water phase and the oil phase of a spray formulation to a sufficient degree to produce a substantially complete instant flash invert emulsion of uniform composition during the relatively short period of time these fluids are retained in the nozzle during a continuous spraying operation.

Yet another object of the invention is to provide a nozzle according to the foregoing objects having replaceable parts adapting it for use in mixing a wide variety of fluids, both miscible and immiscible, including liquids, gases and suspensions, and for producing a desired quantity of such mixtures at the operating pressures in the nozzle.

Still other objects and advantages are inherent and will become apparent upon consideration of the specification, claims and the attached drawings.

The foregoing and additional objects and advantages are realized and drift is substantially reduced during spraying operations according to this invention by a spray system including: a spray formulation comprising an oil phase and a water phase, one or both of which contain one or more agricultural control chemicals which, when combined in proper proportions and mixed together to a sufficient degree, are capable of producing instant flash invert emulsion spray mixtures characterized and distinguished from presently known spraying mixtures by their heavy, thick, creamy or mayonnaise-like consistencies; a spray process for the spray application of such spray mixtures in which the invert emulsion is produced only during the spraying operation and only in sufficient amounts for the actual spraying operation; and spray apparatus particularly well adapted for carrying out the process of the invention to produce the new spray products thereof and including a plurality of multi-fluid nozzles, each capable of mixing the water phase and oil phase components of the spray mixture to a sufficient degree to form the characteristic thick, heavy invert emulsion spray mixture of the invention during the relatively short period of time that these fluids are retained in the nozzle while in continuous spraying operation, means for separately supplying the water phase and oil phase to the nozzles at a desired pressure and means for separating the invert emulsion being discharged from the nozzle into a predetermined spray pattern comprising a plurality of discrete droplets having substantially uniform composition and a limited but predetermined size range.

More particularly, the oil phase component of the spray formulation of this invention includes an inverting carrier system comprising an oil, an emulsifying agent, a wetting agent, and when desired, a spreader-sticker. These ingredients are of such nature and are combined in such proportions that when the carrier system is mixed to a sufficient degree with a proper amount of water, an invert emulsion is formed which is characterized and distinguished from presently known carrier-water mixtures by its thick, heavy, creamy or mayonnaise-like consistency.

Agricultural control chemicals can be easily dissolved in this new inverting carrier system to form oil solutions of active ingredients which, when mixed to a sufficient degree with a specified amount of water or with aqueous solutions of agricultural control chemicals, are capable of forming the characteristic invert emulsion spray product of this invention.

As further distinguished from presently known carriers, the new inverting carrier system of this invention, either alone or combined with agricultural control chemicals to form an oil solution therewith, is capable of substantially instantaneous and complete inversion when mixed with water or with an aqueous solution of an agricultural control chemical in the apparatus of this invention and according to the process thereof.

Another distinguishing characteristic of the preferred invert emulsion spray product of this invention is that it is extremely stable and not easily broken, even when separated into a plurality of relatively small discrete droplets, for example, such as may be required to form a desired spray pattern in a spraying operation.

It will also be seen that as distinguished from presently known spray mixtures, the invert emulsion spray product of this invention, when produced and applied according to the process and apparatus of the invention, can be broken into a predetermined spray pattern comprising a plurality of discrete droplets having uniform composition and a limited but predetermined size range.

Turning now to examples of components and their proportions comprising the preferred inverting carrier system of this invention, we prefer to use a horticultural base oil, for example, a non-phytotoxic horticultural base oil such as is described in the patent to Stull 2,557,618, in amounts ranging from about 50 percent to about 80 percent by weight of the carrier system, exclusive of active ingredients which may be dissolved therein. This oil, which we call CS2, is identified in the Stull patent as horticultural base oil No. 7, Shell Oil Company, having the following properties:

| | |
|---|---|
| Gravity, ° A.P.I. | 41 |
| Color, Saybolt | min. 0 |
| Viscosity, S.S.U. at 100° F. | 38–45 |
| Flash, Cleveland O.C. ° F. | min. 240 |
| Unsulfonated residue, percent B.V. | 94 |
| Boiling range, ° F. | 500–636 |
| Pounds per gal. | 6.84–6.87 |

As emulsifying agents, we prefer to use alkyl aryl polyether alcohols which may be blended with related compounds, for example, Triton X–171 or 9D–208, Rohm and Haas Company, in an amount in the range of about 10 percent to about 15 percent by weight of the carrier system, exclusive of active ingredients which may be dissolved therein. These emulsifiers have the following properties:

| | Triton X–171 | 9D–208 |
|---|---|---|
| Chemical nature and active ingredient concentration, as supplied. | Blends of equal portions of alkyl aryl polyether alcohol (Eto. 9.7) and organic sulfonates. | 80% solution of alkyl aryl polyether alcohol in a non-ionic solubilizing agent. |
| Physical Properties Color (VCS). | 10–12 | 2. |
| Specific Gravity at 25° C. | 1.04–1.06 | 1.02. |
| Weight per gallon | 8.7 lbs. | 8.5 lbs. |
| Viscosity | 200 (Approx.) Saybolt Secs. 100° F. Gardner-Holdt Tube 40° F. 4 Secs. (Approx.). | 500–700 cps. at 25° C. Ca. 4,000 cps. at 3° C. (Brookfield). |

As the wetting agent component in our carrier system, we prefer to use a sulfonated alkyl ester, for example, Triton GR–7 Rohm and Haas Company in amounts ranging from about 10 percent to about 35 percent by weight of the carrier system, exclusive of active ingredients which may be dissolved therein. GR–7 is a solution of 64 percent dioctyl sodium sulfosuccinate in a light petroleum distillate such as Emsco-D, American Solvent Company, the dioctyl sodium sulfosuccinate having the following chemical formula:

$$\begin{array}{l} CH_2COOC_8H_{17} \\ | \\ CHCOOC_8H_{17} \\ | \\ SO_3Na \end{array}$$

and the following physical properties:

TRITON GR–7

| | |
|---|---|
| Viscosity (Gardner-Holdt) | A–3. |
| Specific gravity 20° C. | 1.04. |
| Weight per gallon | 8.7 lbs. |
| Flash point | 137° F. average (Tag Open Cup). |
| pH | Essentially neutral. |

It is sometimes desirable to incorporate a spreader-sticker in a spray formulation to improve the spreading and build characteristics of the spray mixture. In such cases, we prefer to include as a component in our new carrier system a modified phthalic glycerol alkyd resin, for example, Triton B–1956 Rohm & Haas Company in amounts ranging from about 1½ percent to about 3½ percent by weight of the carrier system, exclusive of active ingredients which may be dissolved therein. Triton B–1956 is supplied as a liquid containing about 77 percent of a modified phthalic glycerol alkyd resin in ethylene dichloride, having the following properties:

TRITON B–1956

| | |
|---|---|
| Color | Amber. |
| Viscosity | 245 S.U.S. at 100° F. |
| Specific gravity | 1.055 at 25° C. |
| Weight per gallon | 8.8 lbs. |

The following examples will serve to illustrate the all-purpose inverting carrier system of this invention, as well as various spray formulations of agricultural control chemicals which are capable of producing the instant flash invert emulsion spray product of the invention However, we do not intend to limit the invention to these examples.

*Example 1*

An all-purpose inverting carrier system was prepared having the following composition, the proportions being by weight:

| | Percent |
|---|---|
| CS2 Oil | 73 |
| Emulsifier | 13.5 |
| Wetting agent | 13.5 |

The CS2 oil, emulsifier and wetting agent were the commercial products, horticultural oil No. 7, 9D-208 and Triton GR-7, respectively, as described above. The ingredients, in the proportions indicated, were mixed together at room temperature and pressure to form the all-purpose carrier system of this invention.

This carrier system was combined with water in amounts ranging from 40 percent to 60 percent by weight of water in the mixture. Partial inversion was obtained spontaneously and without manual agitation. However, upon brief moderate manual agitation, a substantially complete invert emulsion was obtained which had a relatively thick, heavy, creamy or mayonnaise-like consistency. The emulsion was found to be extremely stable and showed no sign of separation after standing for several weeks.

*Example 2*

A herbicidal spray formulation was prepared having the following composition, the proportions being by weight:

Oil phase:
 18.5% iso-octyl 2,4,5 trichlorophenoxy acetate
 81.5% of the all-purpose inverting carrier system from Example 1
Water phase:
 100% water The all-purpose carrier system was prepared according to Example 1 and the ester was dissolved therein by mixing at room temperature and pressure to form an oil solution. This relatively thin free-flowing oil solution was very stable and showed no sign of separation after standing for several weeks.

The oil solution was combined with water in amounts ranging from 40 percent to 60 percent by weight of water in the mixture. As in the case of the all-purpose carrier system of Example 1, partial inversion occurred spontaneously and without manual agitation. However, upon brief moderate manual agitation, a substantially complete invert emulsion was obtained. When using 40 percent of water, the invert emulsion had a very thick, stiff and heavy mayonnaise-like consistency. When the amount of water was increased to 60 percent, the invert emulsion had a thinner but still relatively heavy and cream-like consistency. Intermediate amounts of water provided invert emulsions of intermediate consistency.

The oil solution (oil phase) was then combined and mixed with water (water phase) in the range from 40 percent to 60 percent by weight of water to produce a spray mixture according to the process feature of this invention while using the apparatus feature thereof (both presently to be described).

A substantially complete invert emulsion of uniform composition was obtained as a continuous discharge from the mixing nozzle. This invert emulsion had the characteristic creamy consistency at 60 percent of water, and had the characteristic mayonnaise-like consistency at 40 percent of water. Again, intermediate amounts of water produced invert emulsions of intermediate consistency.

*Example 3*

Another herbicidal spray formulation was prepared having the following composition, the proportions being by weight:

Oil phase:
 10.5% 2,4,5 trichlorophenoxy acetic acid
 89.5% of an inverting carrier system having the following composition—

| | Percent |
|---|---|
| CS2 oil | 56 |
| Emulsifier | 12.5 |
| Wetting agent | 29 |
| Spreader-sticker | 2.5 |

Water phase:
 100% water

The CS2 oil, emulsifier, wetting agent, and spreader-sticker were the above-described commercial materials, horticultural base oil No. 7, Triton X-171, Triton GR-7 and Triton B-1956, respectively.

An oil solution was prepared from the ingredients of the oil phase component of the formulation as follows:

A slurry was made by adding the Triton GR-7 wetting agent, and Triton B-1956 spreader-sticker to the 2,4,5 tricholorphenoxy acetic acid. This slurry was heated at a temperature of 110 degrees C., and maintained at that temperature with stirring of the mixture until the acid completely dissolved. The mixture was then cooled slowly to room temperature. The cooled mixture was cut with equal parts by weight of CS2 oil. The resulting oil solution was relatively thin and free flowing and did not separate after standing for several weeks.

This oil solution was combined with water in the range of 40 percent to 60 percent by weight of water in the mixture, similarly as in Example 2, and substantially the same results were obtained. That is, upon brief moderate manual agitation, a substantially complete invert emulsion was formed which had the characteristic creamy or mayonnaise-like consistency previously described. The consistency of the emulsion varied according to the amount of water added as described above.

This oil solution (oil phase) also was combined with water (water phase) in the range of from 40 percent to 60 percent by weight of water to produce a spray mixture according to the process feature of this invention utilizing the apparatus thereof similarly as in Example 2. Substantially the same results were obtained as in Example 2, that is, the invert emulsion was formed essentially instantaneously in the mixing nozzle, and had a substantially uniform composition with a creamy or mayonnaise-like consistency.

*Example 4*

Another herbicidal spray formulation was prepared having the following composition, the proportions being by weight:

Oil phase:
 27.75% butyl ester of 2,2-dichloropropionic acid
 72.25% of the all-purpose inverting carrier system from Example 1
Water phase:
 14.28% triethylamine salt of 2,4,5-trichlorophenoxy-acetic acid
 85.72% water The all-purpose inverting carrier was prepared according to Example 1 and the ester was dissolved therein by mixing at room pressure and room temperature to form an oil solution. The triethylamine salt was dissolved in the water by mixing at room pressure and room temperature to form an aqueous solution.

The oil phase (oil solution) was combined and mixed with the water phase (aqueous solution) in the range of from about 40 to 60 percent by weight of the water phase according to the process of this invention while utilizing the apparatus thereof. A substantially complete invert emulsion was obtained as a continuous discharge from the mixing nozzle, the invert emulsion having a very thick, stiff and heavy mayonnaise-like consistency at 40% of aqueous phase and a thinner but still relatively heavy cream-like consistency at 60% of aqueous solution. Intermediate amounts of aqueous solution provided invert emulsions of intermediate consistency.

*Example 5*

An insecticide spray formulation was prepared having the following composition, the proportions being by weight:

Oil phase:
  100% of the all-purpose inverting carrier system of Example 1
Water phase:
  25% 1,1,1-trichloro-2,2-bis (P-chlorophenyl) ethane (DDT)
  75% water The oil phase and water phase of this formulation also were combined and mixed together in the range of from about 40 to 60 percent by weight of the water phase according to the process of this invention while employing the apparatus thereof. Again, a substantially complete invert emulsion was produced ranging from a very thick, stiff and heavy mayonnaise-like consistency to a thinner but still relatively heavy cream-like consistency.

*Example 6*

Another insecticide spray formulation was prepared having the following composition, the proportions being by weight:

Oil phase:
  2% Malathion (O-O-dimethyl dithiophosphate of diethylmercaptosuccinate
  98% of the all-purpose inverting carrier from Example 1
Water phase:
  100% water The oil phase (oil solution) and water phase (water) of this formulation were combined and mixed together in the range of about 40 to 60 percent by weight of water according to the process of the invention while utilizing the apparatus of the invention. Similarly, as in the case of the previous examples, a substantially complete instant flash invert emulsion was produced varying from a thick, heavy and stiff mayonnaise-like consistency at lower water contents to a thinner, yet still relatively heavy creamy-like consistency, at higher water contents.

*Example 7*

A combination insecticide-herbicide spray formulation was made having the following composition, the proportions being by weight—

Oil phase:
  2% DDT [1,1,1-trichloro-2,2-bis(P-chlorophenyl) ethane]
  98% of the all-purpose inverting carrier system of Example 1
Water phase:
  10% dimethylamine salt of 2,4-dichlorophenoxyacetic acid
  90% water As in the previous examples, the oil phase (oil solution) and the water phase (aqueous solution) were combined and mixed together according to the process of the invention and while employing the apparatus thereof. At 40% by weight of water phase, a stiff, heavy and thick invert emulsion was discharged in a smooth, steady stream from the nozzle, while at 60% of water phase, the invert emulsion was thinner and not so stiff but still of a relatively heavy cream-like consistency.

*Example 8*

A combination fungicide-insecticide spray formulation was made having the following composition, the proportions being by weight:

Oil phase:
  2% Malathion (O-O-dimethyl dithiophosphate of diethylmercaptosuccinate)
  98% of the all-purpose inverting carrier system of Example 1
Water phase:
  20% copper sulfate
  80% water Here again, the oil phase (oil solution) and water phase (aqueous solution) were combined and mixed together in the range of from about 40 to 60% by weight of water phase in accordance with the process feature of this invention and by means of the apparatus of the invention. An instant flash invert emulsion was formed in and discharged from the mixing nozzle in a smooth, steady stream, the invert emulsion being very heavy, stiff and thick at lower water proportions and having a thinner, yet still relatively heavy and cream-like consistency at higher water proportions.

It will be recalled that new difficulties were encountered in attempting to apply the invert emulsion spray product of this invention by spraying it according to presently known premixing spray procedures. That is, excessive pressures were required to pump the premixed invert emulsion through the spray equipment, the spray mixture was discharged from the spray nozzle intermittently and in spurts, rather than smoothly and continuously, and the spray mixture could not be broken into a desired spray pattern even when sufficient spraying pressure was provided.

We have now discovered that these difficulties can be obviated by forming an invert emulsion spray product only during the actual spraying operation and only in sufficient amounts for the spraying operation. That is, the new spraying process feature of this invention comprises the steps of jetting separate streams of the water phase and the oil phase components of an invertable spray formulation into a confined space during the actual spraying operation, either or both of said phases having an agricultural control dispersed therein, mixing said water phase and oil phase in the confined space to a sufficient degree to form the invert emulsion spray product of the invention; and discharging the invert emulsion spray product from the confined space on the target area as rapidly as it is formed. The preferred manner for carrying out the process of this invention will be described in more detail, and will be better understood in connection with the description of the operation of the apparatus of the invention, particularly with regard to the preferred manner for carrying out the mixing step of the process.

Our new spraying process not only overcomes the difficulties encountered when using presently known premixing spraying processes, but also provides additional advantages. For example, a substantial saving in labor is realized inasmuch as the mixing operation is carried out during and in connection with the actual spraying operation, rather than in a separate batch-wise mixing operation as is the present practice. Further, since the water phase and oil phase components are separately supplied to the mixing nozzle, the proportion of these materials can be adjusted, when desired, to vary the composition of the spray mixture during the actual spraying operation. Still further, waste is eliminated, since only a sufficient amount of spray mixture required to accomplish a particular spraying job is produced.

However, other difficulties were encountered in attempting to carry out the process of this invention to produce the products thereof, while utilizing conventional spraying equipment in an attempt to mix the components of the spray formulation during the spraying operation. For example, it was found that presently known spray nozzles do not provide sufficient mixing action to disperse the water phase in the oil phase and produce a substantially complete invert emulsion of uniform predetermined composition and consistency during the relatively short period of time that they are retained in the spray nozzle during a continuous spraying operation. Substantially complete inversion is considered most desirable in order to obtain the maximum benefits made possible by applying spray mixtures in this form. For example, if the spray mixture contains droplets, or portions of oil solution or water, which have not been emulsified, those portions may be broken into extremely small particles during the spraying operation which can drift from a target area to other areas remote therefrom. In addition, incomplete inversion or dispersion results in an uneven distribution of the active ingredients over the target area, even though the spraying mixture is uniformly distributed thereon.

We have now discovered a spray apparatus which overcomes these difficulties, and accomplishes the foregoing objects and advantages. Such apparatus is illustrated in the attached drawings which represent exemplary forms of the apparatus with which the process of the invention may be practiced to produce the products thereof.

In the drawings, wherein like characters of reference designate like parts throughout the several views:

FIG. 1 represents one embodiment of aircraft spray apparatus incorporating novel features of this invention and illustrating the process thereof, the apparatus being shown mounted in operative position on a helicopter;

FIG. 2 is a view taken along line 2—2 of FIG. 1 with the helicopter omitted;

FIG. 3 is an enlarged side view in partial cross section of a portion of the right hand side of the spray boom of FIG. 1, illustrating the manner in which the nozzles are mounted on the spray boom;

FIG. 4 is a further enlarged view in vertical cross section of the nozzle of FIG. 3, and shows one embodiment of the nozzle insert mounted in operative position in the nozzle chamber.

FIG. 5 is a view taken along line 5—5 of FIG. 4;

FIG. 6 is a view taken along line 6—6 of FIG. 4;

FIG. 7 is a view taken along line 7—7 of FIG. 4;

FIG. 8 is a view in vertical cross section of another embodiment of a nozzle insert suitable for use in connection with the nozzle of FIG. 4; and FIG. 9 is a plan view taken along line 9—9 of the insert shown in FIG. 8.

Referring now to the drawings, and in particular to FIGS. 1 and 2, one embodiment of the aircraft spray apparatus of this invention, indicated generally at 16, is shown mounted in operative position on a helicopter 15. This apparatus will be seen to include a plurality of multi-fluid mixing nozzles 25 which are carried by, and longitudinally spaced along a spray boom 26. The spray boom comprises a water phase manifold 17 and an oil phase manifold 18 which are mounted on the helicopter and held in spaced apart relationship as by stringer 27 and cross members 28, respectively. As most clearly seen in FIG. 3, each of nozzles 25 is connected on one side with water phase manifold 17 and on another side with oil phase manifold 18, as by slip joint nipples 31 which have passageways **31*a* therethrough for separately delivering the water phase and the oil phase components of the spray formulation from their respective manifolds to their inlet conduits 32 and 33, respectively, formed in the upper portion of body 34 in each of the nozzles 25** (FIG. 4).

The water phase and oil phase components of the spray mixtures are delivered from water tank 19 and oil tank 20 to their respective manifolds 17 and 18 through water lines 21, **21*a* and oil lines 22, 22*a*, by pumps 23 and 24, respectively. Pumps 23 and 24 are preferably controllable from the cockpit of the helicopter while it is in flight by suitable controls (not shown) to separately deliver the water phase and oil phase to their respective manifolds and each of the mixing nozzles 25** at their desired pressures. That is, the pumps are preferably controllable to either separately increase or decrease the pressure of each fluid in its individual manifold, or to simultaneously increase or decrease the pressure of both fluids in their respective manifolds during the spraying operation.

With this arrangement, it will be seen that the water phase and oil phase components of the spray mixture are handled separately prior to introduction into the mixing areas of the mixing nozzles and are not brought into contact until the actual spraying operation is begun. It will also be seen that the invert emulsion spray product is not produced until actual spraying is desired. This not only substantially reduces the spraying pressure required to spray the invert emulsion (we have found 20 pounds per sq. inch or less to be adequate for most operations), but it also permits accurate control of the relative proportion of the oil and water phases introduced into the mixing nozzles, thereby providing means for producing an invert emulsion spray product of predetermined composition and consistency. Of course, if desired during the actual spraying operation, the consistency and composition of the spray mixture can be changed merely by adjusting the pressures in the manifolds to change the proportion of water phase and oil phase being introduced into the mixing nozzles. Further, as will be explained below, this also permits an operator to change and control the size of the invert emulsion droplets produced in the spray pattern during the spraying operation. Still further, waste is eliminated since only the exact amount of spray mixture required for each spraying operation is produced.

Referring now to FIG. 4, there is shown one embodiment of a multi-fluid mixing nozzle which is particularly well adapted for use as a mixing element in the spray apparatus of this invention with which the process of the invention can be practiced to produce invert emulsion spray products thereof. It will be seen that the nozzle, indicated generally at 25, comprises a body 34 having a chamber 35 formed in the lower portion thereof and an opening 40 in the lower body wall providing access to the chamber from outside the body. Opening 40 is sized and shaped to permit nozzle insert 39 to be moved therethrough for replacement or repair, and is normally closed by cap 41 which is preferably removably mounted on body 34 as by retainer 42.

Insert 39 is removably and sealably mounted in chamber 35 and is adapted to divide the chamber into an upper water phase inlet portion 36, and an intermediate oil phase inlet portion 37 and a lower annular mixing portion 38. That is, the seal means, such as O-ring 45 carried in groove 46 near the upper end of insert body 44, defines the boundary between the water phase and oil phase inlet portions 36 and 37, respectively, while insert separator plate 43, which is formed integrally with and near the lower end of insert body 44, defines the boundary between oil phase inlet portion 37 and annular mixing portion 38 of chamber 35. Insert 39 can be removed for replacement or repair, or another form of insert such as the one shown in FIG. 8 can be mounted in chamber 35 by removing retainer 42 and cap 41, and thereby providing access to the insert through opening 40.

The water phase and oil phase components are delivered under pressure from their respective manifolds 17 and 18 to their respective inlet portions 36 and 37 in the nozzle chamber 35 by water inlet conduit 32, **32*a* and oil inlet conduits 33, 33*a*, respectively, formed in the upper portion of nozzle body 34. According to one of the novel features of the invention, each of nozzles 25 may be provided with quick closing pressure responsive valve means for abruptly starting and stopping flow through the nozzles to prevent overspray at the beginning and end of each pass of the aircraft over the target area. Such valve means may comprise diaphragm valves 29 and 30 in water inlet conduits 32 and 32*a* and in oil solution inlet conduits 33 and 33*a*, respectively. Inasmuch as these valves may be identical in construction and operation, only valve 29 will be described with the understanding that valve 30** may be constructed and operated in the same manner.

Fluid is delivered to annular valve chamber 54 of the valve 29 by conduit 32 and is withdrawn therefrom by conduit **32*a*. A diaphrgam 55 is adapted to form a seal at the connection between the valve chamber 54 and conduit 32*a* and is urged toward the seated or sealed position as by spring 56 which is mounted between pressure plate 57 and valve cap 58. Valve cap 58 is removably mounted on body 34 as by retainer 59. It will be understood that the force exerted by spring 56 urging diaphragm 55** to its closed position can be adjusted so that the valve will open at a predetermined pressure. This opening pressure is preferably slightly below the desired spraying pressure. Thus, at the end of each pass over the target area, the valve can be quickly closed to abruptly stop flow through the nozzle merely by reducing the pressure in the supply system to a value below the opening pressure of valve 29. This eliminates overspray usually encountered as a result of the residual back pressure in the supply system when the pumps are taken off stream, yet avoids the necessity of relieving all the pressure on the supply system between successive passes over the target area. As will be understood, this arrangement not only avoids overspray, but also permits the spraying operation to be carried out up to the exact boundary of the target area on each pass thereover.

The inner walls of cap 41 define the outer and lower walls of annular mixing chamber 38 and have downwardly converging portions 50 spaced radially outwardly from corresponding downwardly converging surfaces 49 formed at the lower end of insert body 44 to provide a relatively small annular downwardly converging passageway or slot 47 between cap 41 and insert 39. Annular converging passageway 47 is connected at its larger end with one side of annular mixing chamber 38 and is connected at its smaller end with outlet orifice 48, formed in cap 41 at the vertex thereof. As shown, converging walls 50, and corresponding converging surfaces 49 may be cone-shaped, thereby providing for a conoidal configuration in the annular converging passageway 47. As will be seen annular conoidal passageway 47 transmits additionally mixed fluids from mixing chamber 38 to outlet orifice 48 during spraying operations, and in addition, provides means for still further and substantially complete mixing of fluid components in the spray formulation prior to their discharge from outlet orifice 48.

During spraying operations, the water and oil phases are delivered under pressure from their respective inlet portions 36 and 37 to annular mixing portion 38 of chamber 35 by passage means formed in removable insert 39. In the embodiment shown in FIGS. 4, 5 and 6, and first with respect to the water phase, such passage means comprises an axial bore 51 formed in insert body 44 which opens at its upper end into water phase inlet portion 36 and terminates at its lower end in body 44 below insert separator plate 43. A plurality of radially outwardly extending ports 52a, 52b, 52c and 52d are formed in body 44 and are preferably equally spaced apart circumferentially thereabout below separator plate 43. Each water phase inlet port is connected at its inner end with bore 51 and connected at its outer end with another side of annular mixing chamber 38, whereby fluids passing therethrough under pressure are jetted radially outwardly toward the walls of mixing chamber 38. The oil phase is delivered from its inlet portion 37 to annular mixing chamber 38 by a plurality of ports 53a, 53b, 53c and 53d, which are formed in insert separator plate 43 and are spaced radially outwardly from body 44 and disposed circumferentially therabout, whereby fluids passing therethrough under pressure are jetted axially downwardly toward the walls of mixing chamber 38.

As can be seen, the water phase ports and oil phase ports are arranged in corresponding pairs, i.e., 52a–53a, 52b–53b, 52c–53c and 52d–53d, and the extensions of the axes of each corresponding pair of ports intersect one another, preferably at right angles. With this arrangement, fluids being jetted axially downwardly and radially outwardly from their respective ports first are impinged upon one another to provide for initial mixing, and then are deflected radially outwardly and directed forcefully against the walls of the mixing chamber whereby they are separated into a plurality of streams which are circulated about the mixing chamber in a turbulent manner and in tortuous paths so as to violently engage one another and the walls of the mixing chamber to provide additional mixing of the fluids. Although we have discovered that the maximum efficiency is obtained when the corresponding pairs of ports are disposed at right angles with respect to one another, it is not intended that this invention be limited to this preferred arrangement inasmuch as the maximum mixing efficiency which the mixing nozzle is capable of delivering may not be required in all cases.

From the foregoing, it is believed clear that the multi-fluid mixing nozzle of this invention, as distinguished from presently known spray nozzles, is constructed so that fluids being passed therethrough under pressure are mixed in at least three stages, with the starting material of each stage being substantially the discharge material of the preceding stage. That is, the fluid inlet ports, the annular mixing chamber, the outlet orifice, and the relatively small annular conoidal passageway connecting the mixing chamber and the outlet orifice, are formed and disposed with respect to one another so that during spraying operations, the water phase and oil phase components of the spray formulation being passed through the mixing nozzle under pressure first are jetted from their respective ports so as to impinge upon one another and provide for initial mixing, or at least partial inversion, of the water and oil phases.

This partially inverted mixture is then directed radially outwardly and forcefully against the walls of the annular mixing chamber whereby it is separated into a plurality of streams, said streams being circulated about the mixing chamber in a turbulent manner and in tortuous paths so as to violently engage one another and the walls of the mixing chamber, and thereby providing for additional mixing and further inversion of the water and oil phases.

The additionally inverted mixture is then forced from the mixing chamber through the relatively small annular conoidal passageway whereby it is separated into a plurality of high velocity streams, said high velocity streams being impinged upon one another at the vertex of the annular conoidal passageway to provide for still further mixing and substantially complete inversion of the water phase and the oil phase, thereby producing the invert emulsion spray product of the invention, said invert emulsion then being discharged from the nozzle through the outlet orifice.

Thus, it will be seen that contrary to presently known spray nozzles, the multi-fluid mixing nozzle of this invention is constructed so that even at relatively low spraying pressures, sufficient differential rate of flow is obtained in the nozzle, primarily through shear both directly and through the intermediate steps of momentum and impact of fluids, to provide the degree of mixing of the water phase and oil phase components of the spray formulation necessary for producing a substantially complete invert emulsion spray mixture of uniform and predetermined composition and consistency during the relatively short period of time that the fluids are confined in the nozzle during a continuous spraying operation.

According to still another novel aspect of the invention, we have found that when the invert emulsion spray mixture is formed during the actual spraying operation, as described above, it can be separated into a predetermined spray pattern comprising a plurality of discrete droplets having substantially uniform composition and a limited but predetermined size range. That is, the size of the invert emulsion droplets in the spray pattern can be controlled so as to fall within a relatively narrow but predetermined size range, with each droplet being of sufficient size so that it will not tend to drift from the target area to other areas remote therefrom, as the presently known spray mixtures tend to do, even when the mixture is applied from aircraft under relatively windy conditions.

The factors which can be changed or varied by the operator during the spraying operation to control the size of the invert emulsion droplets produced in the spray pattern include the spraying pressure and the invert emulsion consistency. Generally speaking, a higher spraying pressure will produce smaller droplets, while the heavier and thicker invert emulsion consistencies will produce larger droplets. Thus, by adjusting the spraying pressure and/or the invert emulsion consistency during the spraying operation, droplets of any desired size can be produced with each droplet being of sufficient size so that it will have very little tendency to drift from the selected target area to other areas remote therefrom, as the presently known spray mixtures tend to do.

For purpose of forming the spray pattern, each of the nozzles 25 may be fitted with suitable means, such as a splatter board 65 carried by cap 41. Splatter board 65 has a face 66 disposed in the path of the invert emulsion being discharged from outlet nozzle 48 formed to deflect the invert emulsion into a fan-shaped spray pattern comprising a plurality of discrete droplets of the type described.

Referring now to FIGS. 8 and 9, there is shown another embodiment of a nozzle insert suitable for use in connection with the mixing nozzle of FIG. 4. It will be seen that this nozzle insert, indicated generally at 39*a*, comprises insert body 44*a* having a cone-shaped lower and 49*a*, an insert separator plate 43*a* near its lower end, and seal means 45*a* carried in a groove 46*a* near its upper end, similarly as in the case of insert 39 (FIG. 4). These elements cooperate in the same manner to provide the same results as previously described in connection with the corresponding elements of insert 39, and further description in this regard is not believed necessary for an adequate understanding of this particular feature of the invention. However, it will be seen that instead of having a plurality of corresponding pairs of water phase and oil phase inlet ports, this insert is provided with an annular full cone flow water slot 60, and an annular full cone flow oil slot 61, which are formed in the insert body 44*a* and separator plate 43*a*, respectively. As in the case of water and oil ports of insert 39 slots 60 and 61 are disposed with respect to one another so that fluids passing therethrough under pressure are impinged upon one another preferably at right angles, to provide for initial mixing and at least partial inversion of the water phase and oil phase. When the insert is mounted in operable position in chamber 35 the water phase is delivered under pressure to slot 60 from water inlet portion 36 through bore 62 and water inlet passages 63 while the oil phase is delivered under pressure to slot 61 from oil inlet portion 37 through oil inlet passageways 64.

From the foregoing, it will be seen that this invention is one well adapted to attain all of the ends and objects hereinabove set forth together with other advantages which are obvious and which are inherent to the structure process and composition.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all the matter herein set forth or shown in the accompanying drawings is o be interpreted as illustrative and not in a limiting sense.

The invention having been described, what is claimed is;

1. A multifluid mixing nozzle for dispersing immiscible fluids comprising:

(A) a nozzle body having a chamber therein and an opening providing access to said chamber from outside said nozzle body;

(B) an insert body mounted in said nozzle body, said insert body comprising:

(1) a cylindrical body having a closed cone-shaped lower end and an axial bore therein;

(2) a seal means carried by said cylindrical body dividing said chamber into an upper inlet portion and an intermediate inlet portion;

(3) a separator plate carried by said cylindrical body dividing said insert body into an upper portion and a lower portion;

(4) a seal means carried by said separator plate sealing said plate to said nozzle body, the combination of said seal means and said separator plate dividing said chamber into said intermediate inlet portion and a lower annular mixing portion;

(5) transverse passages formed in said separator plate to connect said intermediate inlet portion with said lower annular mixing portion;

(6) passages in the lower portion of said cylindrical body extending radially outwardly from said axial bore in said cylindrical body, the axes of said passages and of the transverse passages formed in said separator plate being at substantially right angles with respect to each other;

(C) a cap carried by said nozzle body normally covering the opening therein, said cap having a substantially cone-shaped inner surface spaced radially outwardly from said cone-shaped lower end of said cylindrical body to provide an annular conoidal mixing passageway connected at its upper extremity with said annular mixing portion of said chamber and connected at its lower extremity with an outlet orifice formed in said cap at the vertex end thereof; and (D) means for separately supplying fluid under pressure to each of said upper inlet portion and said intermediate inlet portion of said chamber.

2. A multifluid mixing nozzle according to claim 1, in combination with a splatter board carried by cap (C) of said nozzle.

3. A multifluid mixing nozzle according to claim 1, in combination with quick closing pressure responsive valve means for controlling the flow of fluids supplied to said nozzle by supply means (D) of said nozzle.

References Cited by the Examiner

UNITED STATES PATENTS

| | | | |
|---|---|---|---|
| 1,140,888 | 5/1915 | Eckersley | 239—413 |
| 2,046,592 | 7/1936 | Tracy | 239—407 |
| 2,239,987 | 4/1941 | Bramsen et al. | 239—412 |
| 2,574,900 | 11/1951 | Williams et al. | 239—523 |

FOREIGN PATENTS

| | | |
|---|---|---|
| 1,206,720 | 8/1959 | France. |
| 631,212 | 10/1949 | Great Britain. |

EVERETT W. KIRBY, *Primary Examiner.*